United States Patent [19]

Barabas et al.

[11] Patent Number: 4,554,311

[45] Date of Patent: Nov. 19, 1985

[54] METHOD OF PREPARING AN AQUEOUS SOLUTION COMPRISING VINYLPYRROLIDONE/VINYL ACETATE COPOLYMERS OF VARIOUS MOLECULAR WEIGHTS USING A SINGLE INITIATOR SYSTEM CONSISTING ESSENTIALLY OF T-BUTYLPEROXYPIVALATE

[75] Inventors: Eugene S. Barabas, Watchung, N.J.; James R. Cho, Oakland, both of N.J.

[73] Assignee: GAF Corporation, Wayne, N.J.

[21] Appl. No.: 699,982

[22] Filed: Feb. 11, 1985

Related U.S. Application Data

[62] Division of Ser. No. 419,869, Sep. 20, 1982, Pat. No. 4,520,179.

[51] Int. Cl.⁴ .................... C08F 126/08; C08L 39/06
[52] U.S. Cl. .................................. 524/808; 524/765; 524/767

[58] Field of Search ............ 526/216, 212, 264; 524/765, 767, 808

[56] References Cited

U.S. PATENT DOCUMENTS

| | | | |
|---|---|---|---|
| 3,862,915 | 1/1975 | Fried et al. | 526/264 |
| 3,910,862 | 10/1975 | Barabas et al. | 526/264 |
| 4,027,083 | 5/1977 | Herrle | 526/264 |
| 4,058,655 | 11/1977 | Denzinger et al. | 526/264 |
| 4,361,689 | 11/1982 | Patel et al. | 526/264 |

*Primary Examiner*—Harry Wong, Jr.
*Attorney, Agent, or Firm*—Joshua J. Ward; Marilyn J. Maue

[57] ABSTRACT

Vinylpyrrolidone and vinyl acetate monomers are polymerized using free radical initiator consisting of t-Butylperoxypivalate and preferably in solvent consisting essentially of water, isopropyl alcohol, sec. butyl alcohol or mixtures thereof to produce vinyl pyrrolidone/vinyl acetate copolymer.

1 Claim, No Drawings

METHOD OF PREPARING AN AQUEOUS SOLUTION COMPRISING VINYLPYRROLIDONE/VINYL ACETATE COPOLYMERS OF VARIOUS MOLECULAR WEIGHTS USING A SINGLE INITIATOR SYSTEM CONSISTING ESSENTIALLY OF T-BUTYLPEROXYPIVALATE

This is a division of application Ser. No. 419,869, filed Sept. 20, 1982, now U.S. Pat. No. 4,520,179.

BACKGROUND OF THE INVENTION

Polymerization of N-vinyl-2-pyrrolidone (vinylpyrrolidone) and vinyl acetate by free radical mechanisms to form vinyl pyrrolidone/vinyl acetate copolymer (PVP/VA) is well known and is described for instance in U.S. Pat. No. 2,667,473. The polymerization is usually carried out in water or organic solvent using free radical initiators such as hydrogen peroxide, alkyl hydroperoxides, dialkyl peroxides such as di-tert.-butyl peroxide or azodiisobutyronitrile. Previously suggested initiators have, however, not been completely satisfactory. It has for instance been necessary to use different initiator systems depending upon whether low, medium, or high molecular weight PVP/VA product is desired. While some variation of molecular weight has been possible with previously used initiators, no single initiator has previously been known which could be used for making PVP/VA of a wide range of molecular weights. It has also been difficult with many initiator and solvent systems to obtain polymer of narrow molecular weight range. The toxicity of decomposition products of commonly used initiators has also frequently resulted in product unsuitable for pharmaceutical use. Other disadvantages have included a need for amine or ammonia buffers with hydrogen peroxide to control pH, the production of undesirable impurities as decomposition products of eg. azodiisobutyronitrile initiator, etc. Previously used peroxides such as di-tert-butyl peroxide require the use of extremely high temperatures.

The various disadvantages inherent in use of previously known initiators are largely eliminated or alleviated by the process of the present invention.

SUMMARY OF THE INVENTION

In accordance with the present invention vinylpyrrolidone and vinyl acetate monomers are polymerized in a reaction zone in the presence of free radical initiator consisting essentially of t-Butylperoxypivalate to form vinylpyrrolidone/vinyl acetate copolymer. In preferred embodiments of the invention the polymerization is carried out at a temperature between about 40° C. and about 150° C. and in solvent consisting essentially of water, isopropyl alcohol, sec. butyl alcohol or mixtures thereof.

DETAILED DESCRIPTION OF THE INVENTION

As noted above, previously suggested free radical initiators for initiating polymerization of vinylpyrrolidone and vinyl acetate to form vinylpyrrolidone/vinyl acetate copolymer have not for one reason or other proven entirely satisfactory. It has now been found that many of the disadvantages inherent in use of the previously suggested initiators can be avoided or alleviated by use of t-Butylperoxypivalate as the free radical initiator for this polymerization. t-Butylperoxypivalate is a known free radical initiator which has previously been suggested for other uses such as initiation of vinyl chloride polymerization reactions, but which has not before previously suggested for use in polymerizing vinylpyrrolidone and vinyl acetate to form vinylpyrrolidone/vinyl acetate copolymer. By use of this initiator it has now been found possible to produce PVP of almost any desired molecular weight with the same initiator and to maintain the molecular weight range of the PVP/VA product within narrow limits. Since the use of t-Butylperoxypivalate initiator does not produce toxic decomposition products, this initiator can be used to produce pharmaceutical grade PVP/VA.

In accordance with conventional practice PVP/VA product referred to herein will be characterized primarily in terms of K value. K value is a function of molecular weight and as used herein is calculated by the method set forth in the Encyclopedia of Chemical Technology, Vol. 21, 2nd Ed., p. 427–428 (John Wiley and Sons, 1970).

The present invention is useful in manufacturing PVP/VA having K values ranging from about 10 to about 100 corresponding to number average molecular weights of about 6000 and about 450,000 respectively. K value of PVP/VA produced according to the present invention is dependent primarily upon the amount of isopropyl alcohol or secondary butyl alcohol (sec. butyl alcohol) used relative to the amount of vinylpyrrolidone monomer. Higher K values result from the use of small amounts of alcohol. K value is also to some extent influenced by the operating conditions used, especially pressure, temperature and concentration of free radical initiator, i.e. t-Butylperoxypivalate. In general higher temperatures and initiator concentration result in somewhat lower K values for the PVP/VA product. It is usually preferred to adjust the types and proportions of ingredients so as to produce PVP/VA of the generally desired K value range with operating conditions, especially temperature, being used for the final adjustment to obtain the precise K value desired. This technique allows production of PVP/VA of almost any desired K value with very small variation in molecular weight of the product.

While the invention may be practiced using a wide variety of temperature and pressure conditions, one of the advantages of the invention is that it need not be practiced at the elevated temperatures and pressures commonly used with previously known initiator and solvent systems. This is especially true where PVP/VA of relatively low K value is being produced. For PVP/VA of especially low K value such as between about K 10 and about K 20 temperatures between about 100° and about 150° C. and pressure between about 20 psig and about 150 psig are preferred. For PVP/VA of higher K values, e.g. between about K 20 and about K 90 temperatures between about 40° and about 100° C. and pressures between about 0 psig and about 20 psig are preferred. Elevated temperatures and pressures may of course be used for high K value PVP/VA as well as for low K value PVP/VA, but are not generally considered desirable because of the need for pressurized equipment and the additional energy requirements needed for maintaining such conditions.

In practicing the invention t-Butylperoxypivalate initiator is generally used in amounts between about 0.1% and about 5 weight percent (wt%) based on the total of the vinylpyrrolidone and vinyl acetate monomers. Isopropyl alcohol or sec. butyl alcohol functions both as solvent and as a chain transfer agent so that relatively larger amounts of alcohol as a percentage of the amount of monomer used serve to produce PVP/VA of decreasing K value. Isopropyl alcohol is generally used except when PVP/VA of exceptionally high K values are desired. When used isopropyl alcohol is frequently present in amounts between about 5 wt% and about 100 wt% based on monomer. For PVP/VA of exceptionally low K value, it may be desirable to use increased amounts of initiator or relatively high temperatures or pressures in order to reduce the amount of alcohol chain transfer agent needed.

The relative amounts of vinyl pyrrolidone and vinyl acetate used in practicing the invention may vary considerably depending upon the exact nature of the desired copolymer product. In general vinylpyrrolidone may be used in amounts between about 5 wt% and about 95 wt% based on total vinylpyrrolidone and vinyl acetate monomers with the use of between about 25 wt.% and about 75 wt% on the same basis being preferred. Use of relatively smaller amounts of vinylpyrrolidone relative to the amount of vinyl acetate used results in product which has film forming properties similar to polyvinylacetate. Use of relatively larger amounts of vinylpyrrolidone and relatively smaller amounts of vinyl acetate results in product which has film forming properties similar to polyvinylpyrrolidone.

The amount of water used in the process of the invention may vary widely depending upon the K value desired for the PVP/VA product and the amount of isopropyl or sec. butyl alcohol chain transfer agent used. For manufacturing PVP/VA of low K value, i.e. about 30 or below, it is frequently desirable to omit the water completely and use only sec. butyl alcohol or more preferably isopropyl alcohol. For high K value product the amount of water may be increased with water being used as the only solvent for manufacturing PVP/VA of high K value, e.g. about 90 or above. For ease of processing, the total amount of solvent, i.e. water plus isopropyl or sec. butyl alcohol is preferably between about 40 wt% and about 100 wt% based on the amount of monomer used.

The invention may be practiced as either a batch or continuous process, however, continuous or semi-continuous addition of vinylpyrrolidone and vinyl acetate monomers and t-Butylperoxypivalate initiator is preferred especially in making PVP of low K value.

While PVP/VA product of the process of the invention may include any water and/or isopropyl or sec. butyl alcohol used in making PVP/VA, it is generally preferred to remove at least the alcohol and frequently both the water and the alcohol after the polymerization reaction is complete. Alcohol may be readily removed by distillation and where water and alcohol are both present, an azeotropic mixture is readily removed by distillation. For ease in removing product from the reaction zone it is generally preferred that the product be removed as a water solution. For this purpose an aqueous solution of between about 20 wt% and about 60 wt% solids is preferred. Where water is not used in the process in sufficient quantities for this purpose, it is generally preferred to introduce water to the reaction zone as alcohol is distilled off in order to allow withdrawal of the PVP/VA product as an aqueous solution. Following withdrawal from the reaction zone the aqueous solution of PVP/VA may be transported or stored or water may be removed as by spray drying to produce a solid PVP/VA product.

The following examples are intended to illustrate the invention without limiting the scope thereof.

EXAMPLE 1

A 1 liter kettle equipped with mechanical stirrer, reflux condenser, thermometer and a dropping funnel was purged with nitrogen for 15 minutes after which 125 gm isopropanol and 125 gm distilled water were charged under a blanket of nitrogen. One hundred and twenty five grams of vinylpyrrolidone and 100 gms of vinyl acetate were charged into the dropping funnel. The kettle was heated to 78° C. and 0.2 ml t-Butylperoxypivalate was added after which the VP/VA mixture in the dropping funnel was fed in four portions over 2 hours with one addition of 0.2 ml t-Butylperoxypivalate. At the end of two hours, 0.25 ml t-Butylperoxypivalate and 25 gms of VP were added to the kettle. The kettle was kept at reflux temperature for an additional two hours with one charge of 0.2 ml t-Butylperoxypivalate. The kettle was then cooled down and discharged. Analysis indicated that the product had a solids content of 51.37 wt% and a K value of 38.5.

EXAMPLE 2

A 1 liter kettle equipped as described in Example 1 was purged with nitrogen for 15 minutes after which 200 gms of isopropanol and 50 gms of distilled water were charged under a blanket of nitrogen. The same amount of vinylpyrrolidone and vinyl acetate as described in Example 1 was charged into the dropping funnel. After the kettle was heated to 78° C. and 0.2 ml t-Butylperoxypivalate was added then a feeding of VP, VA and catalyst schedule as described in Example 1 was carried out. The kettle was cooled down and discharged after 4 hours of polymerization. The product had a solids content of 55.86 wt% and a K value of 36.0.

EXAMPLE 3

A 5 liter kettle equipped with mechanical stirrer, reflux condenser, thermometer and dropping funnel was purged with nitrogen for 15 minutes and the following ingredients were charged under a blanket of nitrogen:
1300 g.—vinylpyrrolidone
1500 g.—vinyl acetate
3375 g.—isopropanol
375 g.—distilled water The mixture was then heated to a gentle reflux at 78° C. Fifteen minutes after the addition of 3 ml t-Butylperoxypivalate the feeding of vinylpyrrolidone according to the following schedule was started.
The First Hour: 315 gm VP per hour
The Second Hour: 280 gm VP per hour
The Third Hour: 200 gm VP per hour
The Fourth Hour: 155 gm VP per hour Within the VP feeding period, 3 additional charges of catalyst 3 ml each were carried out. After the VP was completely fed in, the kettle was maintained at reflux temperature for ½ hour and then cooled down and discharged. Analysis indicated the product had a solid of 49.05 wt% and a K value of 30.1.

EXAMPLE 4

A 1 liter kettle equipped as described in Example 1 was purged with nitrogen for 15 minutes after which 250 gm of isopropanol were charged under a blanket of nitrogen. One hundred and twenty five grams of vinylpyrrolidone and 100 gms of vinyl acetate were charged into the dropping funnel. After the kettle was heated to a gentle reflux, 0.2 ml t-Butylperoxypivalate was added. A feeding schedule of VP, VA and catalysts as described in Example 1 was carried out. The kettle was cooled down and discharged. The product had a solid of 47.6 wt% and a K value of 26.1.

While the invention has been described above with respect to certain preferred embodiments, it will be understood by those skilled in the art that various changes and modifications may be made without departing from the spirit or scope of the invention.

What is claimed is:

1. Process for preparing an aqueous solution of vinylpyrrolidone/vinyl acetate copolymer which comprises:
   (a) polymerizing a monomer mixture consisting essentially of N-vinylpyrrolidone and vinyl acetate monomers in a reaction zone in the presence of free radical initiator consisting essentially of t-Butylperoxypivalate and solvent consisting essentially of water or a mixture of water with isopropyl alcohol or sec. butyl alcohol or both to form vinylpyrrolidone/vinyl acetate copolymer; and
   (b) removing product from the reaction zone in the form of an aqueous solution containing between about 20 and about 60 wt. % vinylpyrrolidone/vinyl acetate copolymer.

* * * * *